United States Patent [19]
Mason et al.

[11] Patent Number: 5,257,214
[45] Date of Patent: Oct. 26, 1993

[54] QUALIFICATION OF REGISTER FILE WRITE ENABLES USING SELF-TIMED FLOATING POINT EXCEPTION FLAGS

[75] Inventors: Russell W. Mason; Steven T. Mangelsdorf, both of Ft. Collins, Colo.

[73] Assignee: Hewlett-Packard Company, Palo Alto, Calif.

[21] Appl. No.: 899,202

[22] Filed: Jun. 16, 1992

[51] Int. Cl.⁵ .............................................. G06F 7/00
[52] U.S. Cl. .................... 364/736.5; 364/748
[58] Field of Search ............. 364/736.5, 748, 745

[56] References Cited

U.S. PATENT DOCUMENTS

| | | | |
|---|---|---|---|
| 4,961,161 | 10/1990 | Kojima | 364/736.5 |
| 5,038,313 | 8/1991 | Kojima | 364/736.5 |
| 5,201,056 | 4/1993 | Daniel et al. | 364/748 |

OTHER PUBLICATIONS

DeLano et al., "A High Speed Superscalar PA-RISK Processor" *Proceedings of the Compcon Spring* 1992, *Digest of Papers*, San Francisco, Calif.; Feb. 24–28, 1992.

*Primary Examiner*—David H. Malzahn
*Attorney, Agent, or Firm*—Guy J. Kelley

[57] ABSTRACT

A floating point processor in which floating point register file write enables are self-timed from the exception flags from the respective floating point processing units. This self-timing is achieved by forming the floating point processing units from self-timed logic gates which gate data in accordance with the values of the data itself. In other words, the output of a logic gate is made valid only when all inputs to the logic gate have been evaluated as being valid. Since the floating point exception signals from the floating point processing units are also self-timed and no longer edge triggered, the results of the floating point operation may be written to the register file on the same phase in which the result and the exception flags become valid, thereby allowing processing latency to be reduced by a state. Hence, if there is a floating point exception during a floating point operation, the register cell is not written. The floating point exception flags are also precharged to a true level and remain true until it is conclusively determined that a floating point exception will not result from the current floating point operation. At that time, the register cell is immediately written.

4 Claims, 3 Drawing Sheets

QUALIFICATION OF REGISTER FILE WRITE ENABLES USING SELF-TIMED FLOATING POINT EXCEPTION FLAGS

BACKGROUND OF THE INVENTION

1. Field of the Invention

The present invention relates to exception logic for handling floating point exceptions, and more particularly, to a system for qualifying register file write enables using self-timed floating point exception flags from a floating point processing unit.

2. Description of the Prior Art

Recently, floating point processors have been designed which allow concurrent execution of a floating point multiply, divide, add and load or store instructions, thereby significantly increasing the processing efficiency of a floating point processor. For example, DeLano et al. describe in an article entitled "A High Speed Superscalar PA-RISC Processor", *Proceedings of the Compcon Spring* 1992, *Digest of Papers*, San Francisco, Calif., Feb. 24-28, 1992, a central processing unit comprising an integer processor and a floating point coprocessor which achieves exceptional performance and structural density. The floating point coprocessor consists of a register file, a floating point ALU, a floating point multiplier, and a floating point divide/square root unit and is integrated onto the same chip as the integer processor. Dynamic logic was used to exploit the speed and density characteristics of such circuits using a system of self-timed logic.

The handling of floating point exceptions has been found to be a critical timing path in floating point coprocessors of the type described by DeLano et al. For example, when an instruction causes a trap due to a floating point exception, the contents of the original operand registers and the contents of the destination registers must be preserved so that the trap (or exception) handler can properly process the exception. However, in order to avoid disturbing the contents of the destination register, the destination register cannot be written until after it is known that the floating point operation did not trap. Because floating point exceptions such as overflow, underflow and inexact are based on the rounding of the result, the exception flags cannot be calculated before the result. As a result, the results and the exception flags typically become valid during the same phase. Unfortunately, previous floating point processors have not taken advantage of this characteristic to write the register file in the same phase that the results become valid. Instead, a control line driver has been set up so that the register file is written during the next phase of the clock. This has typically been done to account for static hazards or glitches in the exception flag signals which may carry through to cause glitches in the register file write signals.

Unfortunately, by delaying the write of the result to the register file by a phase, additional latency is added to the floating point operations. In order to prevent this additional latency from impacting floating point performance, an extra level of bypass has typically been required so that the result of the floating point operation which is being written to the register file can be used as an operand without going through the register file. This adds substantial area and complexity to the control design and is generally undesirable.

Accordingly, in order to provide a floating point data path with minimal latency, it is desired to write the destination register during the same phase in which the result of the floating point operation becomes valid. However, in order to do this, the write enable to the register file must be glitch-free (i.e., static hazards must be removed from the write enable signal). In other words, the write enable must be provided to the register file if and only if there are no exceptions and the destination register is to be written. The write enable may not be allowed to glitch true and then return to false in the event of an exception. The present invention has been designed to meet these needs.

SUMMARY OF THE INVENTION

The above-mentioned needs in the art have been met by providing write enables to a floating point register file in response to self-timed floating point exception flags from the floating point processing units. This allows the results of the floating point operations to be written to the register file on the same phase in which the result and exception flags become valid, thereby allowing latency to be reduced by a state. Thus, during operation, if a floating point exception is encountered the register cell is not written. This is assured by defining the "invalid" state of the self-timed floating point exception flags to correspond to the state where an exception is still possible rather than simply "invalid" and by defining traps of the floating point processing units so that they make a transition from "trap" to "no trap" during the clock period in which the results become valid but cannot transition from "no trap" to "trap". As a result, a glitchfree write enable signal may be generated during the same phase that the results of the floating point operation and the traps become valid.

A preferred embodiment of the invention relates to a method of writing the results of an operation by a processing unit to a storage register in the absence of exceptions during the same clock phase that the results become valid. Such a method in accordance with the invention preferably comprises the steps of:

precharging exception flags of the processing unit to a first logic level indicating that an exception has occurred or can still occur during a present clock cycle;

initiating an operation by the processing unit during the present clock cycle;

checking for exceptions caused by the operation which require exception handling;

changing the exception flags of the processing unit to a second logic level indicating the absence of an exception when it is determined in the checking step that no exceptions have been or can be generated in the present clock cycle by the operation which require exception handling;

generating a glitch free control signal indicating that the exception flags of the processing unit have changed to the second logic level; and writing the results of the operation to the storage register during the present clock cycle in response to the glitch free control signal.

The method of the invention is preferably implemented by a floating point processor which performs a floating point operation and writes the results of the floating point operation to a storage register in the absence of floating point exceptions. Such a floating point processor in accordance with the invention preferably comprises a floating point operation unit for performing the floating point operation during a clock cycle, means for generating a glitch free control signal and means for writing the results of the floating point operation to the storage register. In a preferred embodiment, the floating point operation unit comprises self-timed logic circuits which precharge exception flags of the floating point operation unit to a first logic level indicating that a floating point exception has occurred or can still occur during the present clock cycle and change the exception flags to a second logic level indicating the absence of a floating point exception when it is determined that no floating point exceptions requiring exception handling have been ir will be generated by the floating point operation in the present clock cycle. The control signal generating means, on the other hand, outputs a control signal indicating that the exception flags have changed to the second logic level, while the writing means writes the results of the floating point operation to the storage register during the same clock cycle in response to the glitch free control signal.

In a preferred embodiment, the control signal generating means comprises logic gates responsive to the exception flags for determining whether the exception flags are at the second logic level and for outputting the glitch free control signal only when all of the exception flags are at the second logic level. In other words, the exception flags are self-timed and only become valid when it is known that no floating point exceptions have occurred as a result of the current floating point operation.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EXEMPLARY EMBODIMENT

The inventors of the matter disclosed and claimed herein have satisfied the above-mentioned needs in the art by developing a floating point processor which generates write enable signals in response to self-timed exception flags from self-timed floating point processing units. A floating point processor implementing a presently preferred exemplary embodiment of the invention will be described below with respect to FIGS. 1-3. However, it will be appreciated by those of ordinary skill in the art that the description given herein with respect to those figures is for exemplary purposes only and is not intended in any way to limit the scope of the invention. For example, the invention need not be limited to floating point circuitry and may include other types of processing circuitry which generates exceptions. Accordingly, all questions regarding the scope of the invention should be resolved by referring to the appended claims.

Figure 1:
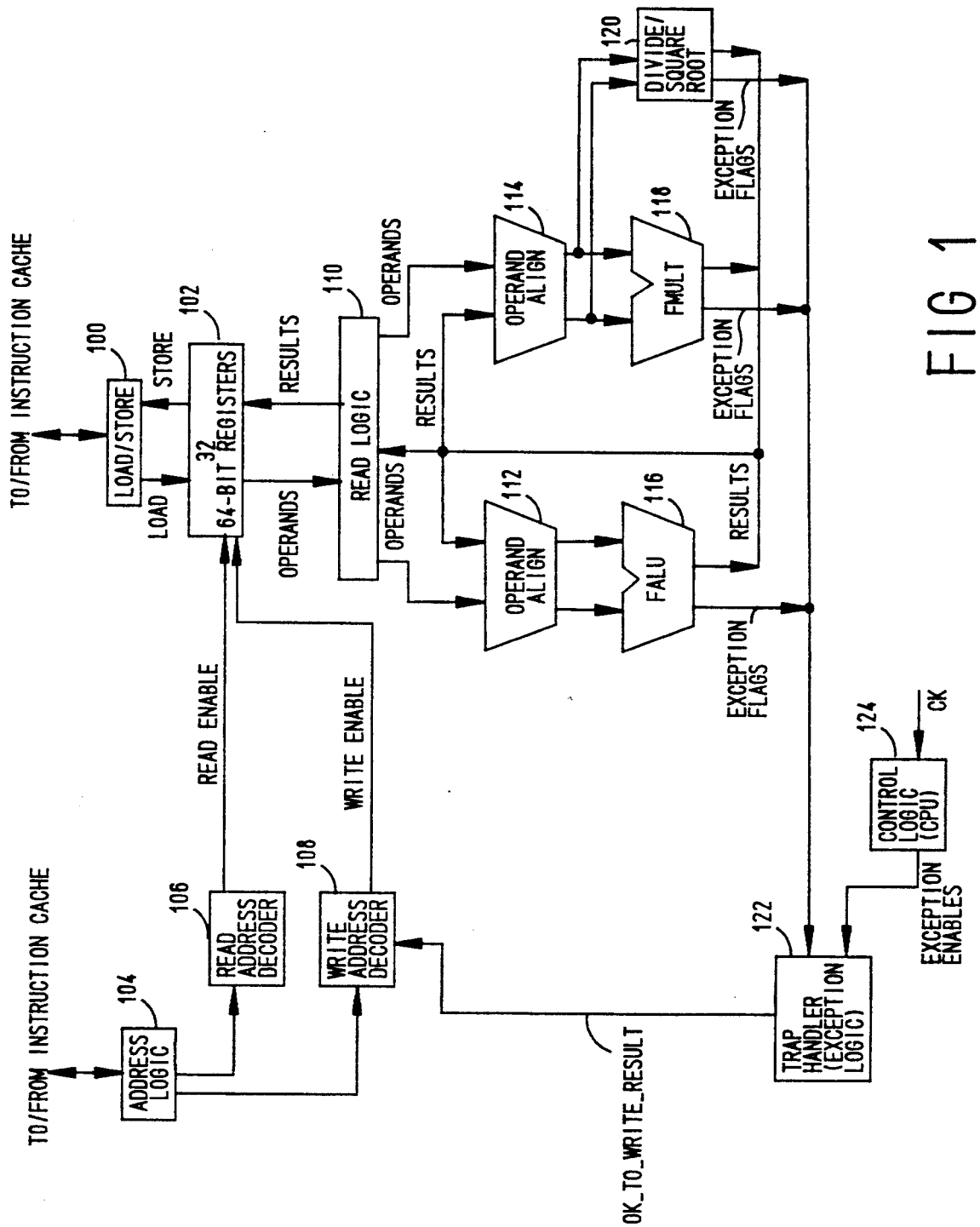
FIG. 1 illustrates a preferred embodiment of a floating point data path implementing self-timed floating point exception flag write enable techniques in accordance with the invention.
Figure 2:
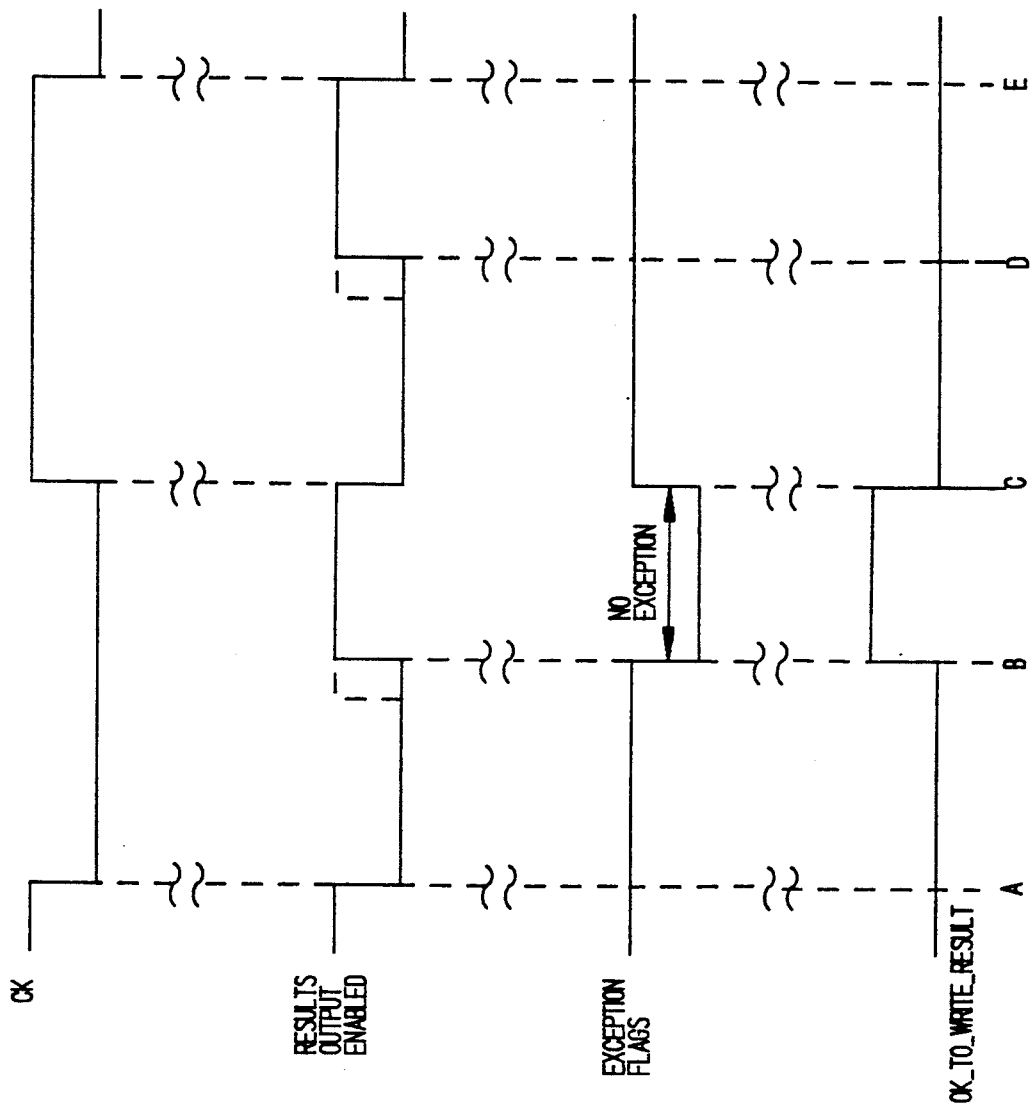
FIGS. 2(a)-2(d) illustrate timing signals for understanding the operation of the system of FIG. 1.

FIG. 1 illustrates a sample embodiment of a floating point processor in accordance with the invention. As illustrated, the floating point processor preferably comprises load/store logic 100 which loads data into respective 64-bit registers of memory cell 102 and includes sensing amplifiers which detect output values from these 64-bit registers which are to be stored into a data cache of the floating point processor (not shown). Memory cell 102 may comprise a static ram (SRAM) or some other memory device well known to those skilled in the art and may be arranged as thirty-two 64-bit registers for double precision operations or sixty-four 32-bit registers for single precision operations. Address logic 104 receives the address for the data from an instruction cache (not shown) of the floating point processor and may predecode the address data in accordance with techniques known to those skilled in the art. The read address from address logic 104 is then decoded by read address decoder 106 and a read enable signal provided to the appropriate register of memory cell 102. Similarly, the write address from address logic 104 is decoded by write address decoder 108 and a write enable signal provided to the appropriate register of memory cell 102 when a write enable signal generated in accordance with the invention has been provided to the write address decoder 108.

Operands and the like stored in the registers in memory cell 102 may then be read out by read logic 110 which may include, for example, sensing amplifiers which detect output values from the memory cell 102 which are to be passed to the floating point processing units. The operands are then sent downstream to operand alignment units 112 and 114 and then input into respective floating point processing units such as floating point ALU (FALU) 116, floating point multiplier (FMULT) 118 and floating point divide/square root unit 120. Results from the operations on the operands by these floating point processing units are also passed back for storage in the registers of memory cell 102 for use in future floating point operations. Those skilled in the art will also appreciate that the memory cell 102 may also include registers for storing the floating point exception data and the like.

As noted above, the present invention is characterized in that the results of the floating point operations performed by FALU 116, FMULT 118 or divide/square root unit 120 can be written to the register file 102 during the same phase in which the results and the exception flags become valid. This is made possible in accordance with the present invention by defining the exception flags to be monotonic (i.e., making no more than a single transition during the evaluation phase) and by starting the evaluation phase in the "trap" (or exception) condition so that a glitch free write enable signal can be generated during the evaluation phase. In particular, the floating point processing units FALU 116, FMULT 11S and divide/square root unit 120 generate a glitch free exception signal during the same phase in which the result becomes valid by implementing the self-timing logic techniques described by Yetter in U.S. patent application Ser. No. 07/684,720, filed Apr. 12, 1991, now U.S. Pat. No. 5,208,490, and assigned to the same Assignee as the present invention.

As described by Yetter in the aforementioned patent application, self-timed logic circuits are timed in accordance with transitions in the data itself rather than in response to clock edges. Such a self-timed system implements logic paths for encoding respective "vector logic states" which are defined and specified by collectively conceptualizing the individual logic states or "vector components" on the logic paths. In particular, an "invalid" vector logic state is defined as the case when all vector components are at a logic low (a logic "0" or a low electrical signal level). On the other hand, each of the "valid" vector logic states is specified via a variety of schemes such as one in which one and only one of the vector components of a vector logic state exhibits a logic high (a logic "1" or high electrical signal level). Encoding of the vector logic states can then be handled by defining a valid vector logic state by more than one logic path while still defining an invalid vector logic state when all logic paths exhibit a low logic level.

Thus, the logic circuits for the floating point processor in accordance with the invention are preferably formed from self-timed logic circuits which are similar to dynamic logic gates in that they require a periodic electrical precharge, or refresh, in order to maintain and properly perform the intended logic function. However, by defining the inputs in accordance with the invention as "vector logic states", the logic will maintain a predetermined logic level representing an invalid vector output until sufficient input vector logic states are present to allow the output to change to a level representing a valid vector output. Hence, the logic circuits of the invention will only provide a valid output if mandated by valid vector inputs as a result of the upstream logic functions. As a result, when the output changes states, all input vectors are known to be valid.

The present inventors have extended the concept described by Yetter to the handling of exception flags in the critical data path of a floating point processor by identifying the respective exception flags as the vector inputs to self-timed floating point exception logic and by only writing the results when it has been conclusively determined that there has not been or cannot be an exception in the present clock cycle. For this purpose, the "invalid" state of the vector logic is defined as "exception still possible" rather than "invalid" as would be the case in the aforementioned Yetter application.

As further illustrated in FIG. 1, the respective self-timed exception flags output by FALU 116, FMULT 118 or divide/square root unit 120 are provided to a trap handler 122 which includes exception logic for generating a write enable signal in accordance with the invention. Trap handler 122 provides in addition to conventional trap handling circuitry exception logic which provides an output signal "ok—to—write—result" only when it has been conclusively determined that no floating point exception was encountered during the present floating point operation. Only at this time is the write address decoder 108 enabled so that the results may be written to register file 102.

During operation, the respective floating point processing units FALU 116, FMULT 118 and divide/square root unit 120 respectively change the states of exception flags therein when it has been determined at the end of the rounding process, for example, that no exceptions have occurred as a result of the current floating point operation. Then, the values of the floating point exception flags which were previously charged using the self-timed logic technique to indicate the existence of an exception are discharged so that the output will change logic level. The output thus changes logic level only when it has been conclusively determined that no floating point exception occurred during the current floating point operation. This transition from, for example, a high logic level to a low logic level (FIG. 2(c)) would indicate that no floating point exception occurred during the current floating point operation and that it is safe to write the results of the floating point operation to the register file 102.

As illustrated in FIG. 1, trap handler 122 receives exception enables from control logic 124, which may be part of a central processing unit and hence responsive to an input clock signal CK (which may be at 100 MHz). These exception enables indicate whether a trap is desired at all for a particular exception flag. In other words, the exception enables indicate whether a trap is to be performed or whether a value such as zero, infinity or the like are to be used instead of performing a trap function. These exception enables may be enabled early during the floating point processing so that the trap handler 122 knows before the completion of a floating point operation whether a particular exception is to be enabled for that operation. The values of these exception enables may be kept in registers in control logic 124 for specifying which exceptions to enable, but those skilled in the art will appreciate that memory cell 102 may also include registers for storing such floating point exception data and the like.

FIGS. 2(a)-2(d) show timing diagrams which illustrate how the write enable signal "ok—to—write—result" is generated in accordance with the invention. As illustrated in FIG. 2(a), the input clock signal CK has an "invalid" or low state and a "valid" or high state and may operate at frequencies on the order of 100 MHz. The exception flags of the floating point processing units are typically precharged high during the "invalid" portion of CK as illustrated in FIG. 2(c). Then, as illustrated in FIG. 2(c), during the "valid" or evaluation portion of CK the floating point exception flags go low only if there is not a floating point exception. Since the exception signals are self-timed, they do not glitch low and then return high if there is a floating point exception and hence are monotonic and glitch-free in accordance with the invention.

FIG. 2(b) illustrates the results output of the floating point processing unit. As shown, the floating point processing is completed during the same portion of CK in which the floating point exception becomes valid. For ease of description, the exception flags in FIG. 2(c) are illustrated to be valid at the same time that the results output of FIG. 2(b) is enabled; however, those skilled in the art will appreciate that the floating point results may be available for output at some point before the exception flags are enabled (as shown in phantom in FIG. 2(b)) since the floating point exception flags typically are based on the rounding of the result and hence become valid only after the results become valid.

As noted above, since they are self-timed, the floating point exception flags only change state when it has been conclusively determined that there is no exception. Hence, in FIG. 2(c), since no exception occurred in the floating point operation performed during CK, the exception flag output goes low between timing intervals B and C. On the other hand, if an exception does occur during CK, the precharged exception flag output remains high between timing intervals D and E. Accordingly, the "ok—to—write—result" signal illustrated in FIG. 2(d) only enables the write address decoder 108 during timing interval BC since no floating point exception occurred. As illustrated, the results output (FIG. 2(b)), the exception flags (FIG. 2(c)), and the write enable signal (FIG. 2(d)) are reset when CK goes low.

Thus, in order to generate a glitch-free CK exception signal in accordance with the invention, the exception flags output by the floating point processing units may be simply logically ANDed with the exception enables provided by control logic 124 and then the results logically ORed together in accordance with the following equation:

ok_to_write_result=inv(overflow * overflow_enabled+underflow * underflow enabled+inexact * inexact_enabled+divby0_* divby0 enabled+invalid *invalid_enabled+unimplemented).

Figure 3:
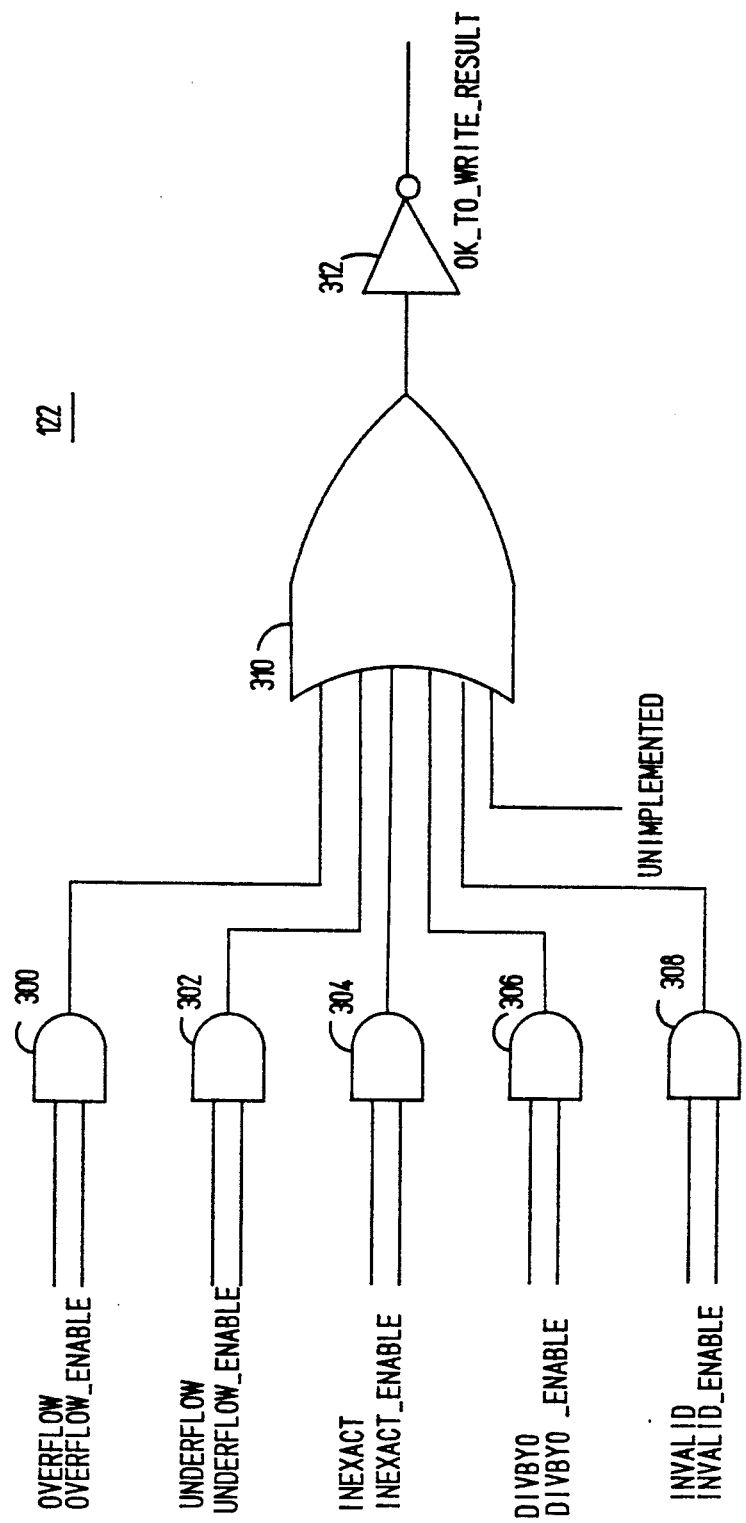
FIG. 3 illustrates a simple exemplary embodiment of logic for generating a qualified write enable signal in response to a self-timed exception flags from the floating point processing units.

As illustrated in FIG. 3, this equation may be implemented using AND gates 300-308, OR gate 310 and inverter 312.

Since only the overflow, underflow and inexact exception signals are late in arriving from the rounding circuit during a floating point operation, these exception signals are the critical timing paths. The corresponding enables are essentially DC because they are set up before the floating point operations, while the other exception flags are based on comparisons of the source operands and are valid before those exception flags based on rounding. Since the latter flags should not be critical timing paths, they are easy to implement. Also, since the exception flags are precharged high when CK is low ("invalid") and are not allowed to glitch low and then return high if there is an exception, the "ok_to_write_result" signal is driven low ("false") when CK is valid and only goes high ("true") if there is no floating point exception which would inhibit the write of the result to the register file 102. Moreover, since the register file 102 may be written in the same clock state that the results are valid, a state of latency may be eliminated in accordance with the present invention with the obvious performance advantages. The need for control and logic to provide a second level of bypass is also eliminated so as to save substantial chip area and eliminate the resulting complexity.

In accordance with the invention, the exception flags of the floating point processing units are precharged to go low only if it has been conclusively determined that there is no floating point exception as a result of the current floating point operation. Hence, by monitoring the value of the self-timed exception flags and only writing the results to the register file 102 when the exception flags indicate no exception, a glitch-free qualified write enable signal may be provided in accordance with the invention. Those skilled in the art will appreciate that what is important to the invention is that the write enable be responsive to a change of state of the exception flags so that the register file 102 may be written to immediately upon the change in state of the exception flags rather upon receipt of the next clock edge. Moreover, glitch free signals provided to the trap handler 122 of the invention enable the self timing of the exception flags to be propagated through to the write address decoder 108 so that the glitch-free timing is preserved. Since the self-timing is thus rippled through the circuitry, it is not necessary for the circuitry of the invention to be edge triggered by CK.

Although an exemplary embodiment of the invention has been described in detail above, those skilled in the art will appreciate that many additional modifications are possible in the exemplary embodiment without materially departing from the novel teachings and advantages of the invention. For example, the self-timed logic circuits of the floating point processor may make logic determinations from gate component to gate component as a monotonic progression whereby data is transferred from stage to stage of the logic gates by considering only the state transition from low to high, and not from high to low, on any particular logic path. This may be accomplished by providing true and complementary outputs for each logic state so that one goes low after an evaluation while the other goes high. By knowing the direction of the logic state transition, the specific hardware design of the switching components can be manipulated to maximize the speed in the monotonic direction notwithstanding the detriment to the opposite direction. Accordingly, all such modifications are intended to be included within the scope of this invention as defined in the following claims.

We claim:

1. A method of writing the results of a data operation by a processing unit to a storage register in the absence of exceptions, comprising the steps of:

precharging exception flags of said processing unit to a first logic level indicating that an exception has occurred or can still occur during a present clock cycle;

initiating an operation by said processing unit during the present clock cycle;

checking for exceptions caused by said operation which require exception handling;

changing said exception flags of said processing unit to a second logic level indicating the absence of an exception when it is determined in said checking step that no exceptions have been or can be generated in the present clock cycle by said operation which require exception handling;

generating a glitch free control signal indicating that said exception flags of said processing unit have changed to said second logic level; and writing the results of said operation to said storage register during the present clock cycle in response to said glitch free control signal.

2. A processor for performing a data operation and writing the results of said operation to a storage register in the absence of exceptions, comprising:

a processing unit for performing said operation during a clock cycle, said processing unit comprising self-timed logic circuits which precharge exception flags of said processing unit to a first logic level indicating that an exception has occurred or can still occur during said clock cycle and change said exception flags to a second logic level indicating the absence of an exception when it is determined that no exceptions requiring exception handling have been or can be generated in said clock cycle by said operation;

means for generating a glitch free control signal indicating that said exception flags of the processing unit have changed to said second logic level; and means for writing the results of said operation to said storage register during said clock cycle in response to said glitch free control signal.

3. A processor as in claim 2, wherein said control signal generating means comprises logic gates responsive to said exception flags for determining whether said exception flags are at said second logic level and for outputting said glitch free control signal only when all of said exception flags are at said second logic level.

4. A processor as in claim 2, wherein said processing unit comprises one of a floating point arithmetic logic unit, a floating point multiplier, and a floating point divider.

* * * * *